United States Patent
Logan et al.

(10) Patent No.: US 6,405,664 B1
(45) Date of Patent: Jun. 18, 2002

(54) PROCESSES AND SYSTEMS FOR USING BIOMINERAL BY-PRODUCTS AS A FUEL AND FOR $NO_x$ REMOVAL AT COAL BURNING POWER PLANTS

(75) Inventors: Terry J. Logan, Columbus; James D. O'Neil, Dunbridge; Ervin Louis Faulmann; Timothy Joseph Nicholson, both of Toledo, all of OH (US)

(73) Assignee: N-Viro International Corporation, Toledo, OH (US)

( * ) Notice: Subject to any disclaimer, the term of this patent is extended or adjusted under 35 U.S.C. 154(b) by 0 days.

(21) Appl. No.: 09/839,112

(22) Filed: Apr. 23, 2001

(51) Int. Cl.[7] .............................. F23C 1/10; C05F 11/00
(52) U.S. Cl. ...................... 110/345; 110/261; 110/219; 110/342; 110/347; 71/903; 71/11; 71/25
(58) Field of Search ................................. 110/261, 219, 110/297, 342, 344, 346, 345, 347; 71/903, 11, 25

(56) References Cited

U.S. PATENT DOCUMENTS

| | | | |
|---|---|---|---|
| 3,476,683 A | 11/1969 | Liljegren | 210/8 |
| 3,877,920 A | 4/1975 | Carlberg | 71/21 |
| 4,079,003 A | 3/1978 | Manchak | 210/46 |
| 4,143,122 A * | 3/1979 | Laufhutte | 423/574 R |
| 4,159,682 A | 7/1979 | Fitch et al. | 110/245 |
| 4,255,129 A * | 3/1981 | Reed et al. | 432/13 |
| 4,532,873 A * | 8/1985 | Rivers et al. | 110/347 |
| 4,554,002 A | 11/1985 | Nicholson | 71/12 |
| 4,781,842 A | 11/1988 | Nicholson | 210/751 |
| 4,787,323 A | 11/1988 | Beer et al. | 110/346 |
| 4,902,431 A | 2/1990 | Nicholson et al. | 210/751 |
| 4,946,382 A * | 8/1990 | Kobayashi et al. | 431/8 |
| 4,970,803 A | 11/1990 | Keller | 34/10 |
| 4,997,572 A | 3/1991 | Wurtz | 210/710 |
| 5,135,664 A | 8/1992 | Burnham | 210/751 |
| 5,196,043 A | 3/1993 | Wurtz | 71/12 |
| 5,211,723 A * | 5/1993 | Khan et al. | 48/197 R |
| 5,229,011 A | 7/1993 | Christy, Sr. et al. | 210/751 |
| 5,275,733 A | 1/1994 | Burnham | 210/609 |
| 5,277,826 A | 1/1994 | Burns et al. | 210/751 |
| 5,307,765 A * | 5/1994 | Virr | 122/4 D |
| 5,346,616 A | 9/1994 | Christy, Sr. et al. | 210/179 |

(List continued on next page.)

FOREIGN PATENT DOCUMENTS

JP 03059303 A * 3/1991 ............ F23C/11/00

OTHER PUBLICATIONS

*Sludge Co–combustion: The cost effective solution for sewage sludge management*, www.dirkgroup.com/cocombustion.htm, pp.1–3.

*Alkaline Reagents in the N–Viro Process and Effects on N–Viro Soil*, N–Viro Soil Research and Experience on Product Use 8, pp. 1–2 (1996).

M. McCoy, *Cleaning up the air with chemicals*, C&EN Northwest News Bureau, pp. 35,36, 38 (2001).

Primary Examiner—Ira S. Lazarus
Assistant Examiner—K. B. Rinehart
(74) Attorney, Agent, or Firm—Kenyon & Kenyon

(57) ABSTRACT

A process is provided for $NO_x$ removal at coal burning power plants, which includes introducing ammonia that is liberated upon drying a mixture of organic waste, coal combustion by-products, and optionally lime, having a pH of at least 9.5, to a coal burner in the power plant. A process is also provided for fueling a coal burner of a power plant with coal and a dried mixture of organic waste and coal combustion by-products. The present invention is further directed to the dried mixture of organic waste and coal combustion by-products made by the processes of the present invention, which may optionally be used as a soil additive or as a supplemental fuel.

25 Claims, 1 Drawing Sheet

U.S. PATENT DOCUMENTS

| | | |
|---|---|---|
| 5,417,861 A | 5/1995 | Burnham ..................... 210/609 |
| 5,422,015 A | 6/1995 | Angell et al. ................ 210/751 |
| 5,746,006 A | 12/1995 | Duske et al. .................. 34/136 |
| 5,490,907 A | 2/1996 | Weinwurm et al. ........... 203/29 |
| 5,525,239 A | 6/1996 | Duske ......................... 210/739 |
| 5,837,142 A | 11/1998 | Mullerheim et al. ........ 210/650 |
| 5,849,050 A * | 12/1998 | Wolf ........................ 48/197 R |
| 5,853,590 A | 12/1998 | Burnham ..................... 210/609 |
| 5,937,770 A * | 8/1999 | Kobayashi et al. ......... 110/263 |
| 6,048,510 A * | 4/2000 | Zauderer ..................... 423/235 |
| 6,056,880 A | 5/2000 | Boss et al. ................... 210/695 |
| 6,234,093 B1 * | 5/2001 | Finker et al. ................ 110/266 |
| 6,237,246 B1 | 5/2001 | Millard ......................... 34/343 |
| 6,298,796 B1 * | 10/2001 | Okazaki et al. .............. 110/345 |

* cited by examiner

PROCESSES AND SYSTEMS FOR USING BIOMINERAL BY-PRODUCTS AS A FUEL AND FOR $NO_x$ REMOVAL AT COAL BURNING POWER PLANTS

FIELD OF THE INVENTION

The present invention is directed to a process and system for $NO_x$ removal at coal burning power plants, which includes introducing ammonia that is liberated upon drying a mixture of organic waste and coal combustion by-products having a pH of at least 9.5, to a coal burner in the power plant. The present invention is also directed to a process and system of fueling a coal burner of a power plant with coal and a dried mixture of organic waste and coal combustion by-products. The present invention is further directed to the dried mixture of organic waste and coal combustion by-products made by the processes of the present invention.

BACKGROUND OF THE INVENTION

Mineral by-products have been used in stabilizing semi-solid, odorous organic waste through bulk drying, odor absorption, and granulation (see e.g., U.S. Pat. Nos. 3,877,920 and 4,554,002). In addition, mineral materials including sand, diatomaceous earth, perlite, and various mineral reagent powders have been used in conjunction with fluidized heating, drying and burning of sludges and oily waste (see e.g., U.S. Pat. Nos. 4,159,682, 4,787,323, 4,970,803, 5,490,907). However, existing thermal dryers have ongoing problems with drying waste high in organics, particularly sewage sludges, in the waste sticking to dryer surfaces, charring and producing burnt organic matter odors, and catching on fire.

Organic waste has traditionally been disposed of by incineration, primarily in stand-alone plants designed for a particular waste. Wet waste, such as dewatered sewage sludge filter cake, requires supplemental fuel to initiate and sustain burning, and sludges are not self-burning until solids contents are greater than about 30%. Dry organic waste such as paper and cardboard are net energy producers and municipal refuse incinerators that use these feedstocks are capable of significant power generation. Likewise, dried animal manures like broiler chicken litter, which contains sawdust that is used as bedding, can have a solids content in excess of 75% and can be incinerated with out supplemental fuel. Methods of more efficiently disposing of organic waste are desirable.

$NO_x$ created during the burning of coal can react with volatile organic compounds in the presence of heat and sunlight to form ozone. Gaseous ammonia, in the form of commercial anhydrous ammonia and its main derivative, urea, are currently used in treating fossil fuel combustion exhausts for $NO_x$ removal. This is a very expensive process, however. Therefore, inexpensive sources of ammonia or methods of recycling ammonia are desirable.

SUMMARY OF THE INVENTION

The present invention is directed to processes and systems for $NO_x$ removal at coal burning power plants, which include introducing ammonia liberated upon drying a mixture of organic waste and coal combustion by-products having a pH of at least about 9.5 or 10, to a coal burner in the power plant. The liberated ammonia that is introduced to the coal burner by the present processes and system, may supplement commercial anhydrous ammonia or urea added to the coal burner for $NO_x$ removal.

The present invention is also directed to processes and systems of fueling a coal burner of a power plant with coal and a dried mixture of organic waste and coal combustion by-products. The coal is preferably pulverized coal. In this embodiment, the dried mixture of organic waste and coal combustion by-products is a source of supplemental fuel to the coal burner.

The present invention is further directed to the dried mixture of organic waste and coal combustion by-products made by the processes of the present invention.

In the processes and systems of the present invention, the mixture of organic waste and coal combustion by-products optionally additionally contains lime. Additionally, during drying, the mixture is dried to preferably at least 90% solids. The drying preferably takes place in a direct or indirect dryer and preferably uses waste heat from the power plant.

Examples of organic waste used in the process of the present invention include, but are not limited to, dewatered sewage sludge filter cake, various animal manures, pulp and paper waste, shredded paper and cardboard, food waste, and other organic industrial waste.

DETAILED DESCRIPTION

Figure 1:
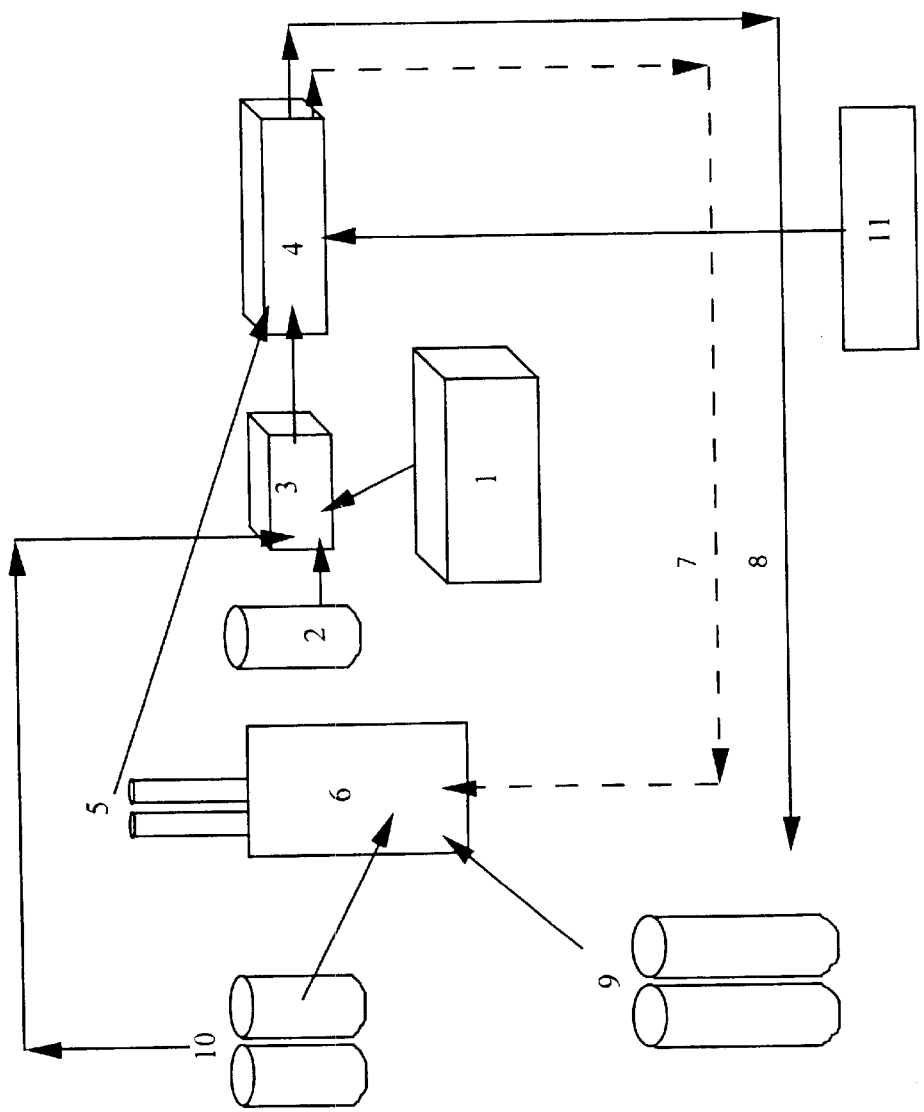
FIG. 1 is a flow diagram of the organic waste drying and fuel feed system of the present processes and systems.

The present invention will now be described in detail with regard to specific preferred embodiments of the invention, it being understood that these embodiments are intended only as illustrative examples and the invention is not to be limited thereto.

Coal-fired power plants must deal with the problems of $NO_x$ removal from exhaust gases, renewable fossil fuel power generation, and dissipation of waste energy. The present inventors have arrived at a system that synergistically incorporates the processes of drying organic waste, and reducing $NO_x$ emissions at a power plant, which utilizes waste (heat and by-products) from each process in the other process.

Drying organic waste, which typically contains from 12 to 75% solids, depending on waste type, is energy intensive. In the present invention, in which drying is conducted at a power plant, waste heat from the plant can be used as the heat source in drying the organic waste. Power plants produce three types of waste heat: hot exhaust gases, steam and hot water. These sources are readily available for organic waste drying. Whereas, if the power plant did not have a recipient for the excess heat, the heat would have to be further treated, e.g., excess steam or hot water must be cooled before they can be discharged back into the environment. The present invention reduces or eliminates the excess cooling step in present power plants because the heat is used directly in the treatment of organic waste.

Organic waste produces ammonia under certain conditions (i.e. at a pH above about 9.5 or 10.0), which excess ammonia may be used to reduce $NO_x$ emissions at a power plant.

A process is provided for $NO_x$ removal at coal burning power plants, which includes supplying liberated ammonia from waste treatment to a coal burning power plant. The process includes mixing organic waste with coal combustion by-products to form an organic waste-coal combustion by-product mixture having a pH of at least 9.5, preferably at least 10. As set forth in a U.S. Provisional Application filed on Apr. 20 2001 entitled "Methods for Controlling Ignitability of Organic Waste with Mineral By-Products", which is hereby incorporated by reference herein in its entirety, the addition of coal combustion by-product to organic waste prior to drying prevents fires and explosions that are common in conventional organic materials drying.

The process of the present invention then includes drying the organic waste-coal combustion by-product mixture to at least 90% solids, preferably at least 95% solids, most preferably as near 100% solids as possible, thus forming a "dried organic waste-coal combustion by-product mixture" and causing ammonia to be liberated from said organic waste. The liberated ammonia is introduced into a coal burner of a coal burning power plant for $NO_x$ removal.

Examples of organic waste that are mixed with coal combustion by-products in the processes and systems of the present invention include, but are not limited to, sewage sludges, such as dewatered sewage sludge filter cake, various animal manures, pulp and paper waste, shredded paper and cardboard, fermentation waste, food waste, and other industrial organic waste. What is meant by the named types of waste would be readily apparent to those skilled in the art.

At pH conditions greater than about 9.5 or 10.0, and under dry and hot conditions, the ammonia in these wastes is converted to free gaseous ammonia. In particular, organic waste such as sewage sludges, animal manures, fermentation biomass, and some food waste are high in protein and ammonia. Organic wastes that are particularly suitable for use in the present invention contain ammonia that is liberated under certain conditions when the organic waste is in a mixture having pH's above about 9.5 or above about 10.0.

Coal combustion by-products may include by-products from the coal burner from which $NO_x$ is removed by the process of the present invention or coal combustion by-products from another source. Examples of coal combustion by-products according to the present invention include, but are not limited to the following by-products: fly ash, fluidized bed ash, flue gas desulfurization byproducts, lime, calcium hydroxide, and calcium carbonate. In particular, preferred coal combustion by-products include alkaline mineral by-products.

Fly ashes are the mineral residues of burning coal for electricity generation. Fly ash can be collected from the smoke stack of a burner (or furnace) by bag houses, electrostatic precipitators, or in down washes. Fly ashes have variable fineness, solids content, and chemical composition. Preferable fly ashes for use in the present invention are dry ashes. The chemical composition of ash depends on the type of coal that is burned. For example, coals from the western U.S. are typically high in calcium and thus, may contain a higher lime content than coals from the eastern U.S. Eastern coals are often higher in pyrite ($FeS_2$), which oxidizes on burning to $SO_2$, producing an acidic fly ash. Fly ashes are high in silicon, and are often in the form of a spherical glass. Some fly ashes are high in residual carbon in the form of charcoal and these are effective in absorbing biosolids odors.

Fluidized bed ash (FBA) refers to ash that is produced in a fluidized bed burner, in which a mixture of pulverized coal and limestone is burnt as a suspended, i.e., fluid, mass, the purpose of the limestone being to react with $SO_2$ produced from the oxidation of pyrite in the coal.

Flue gas desulfurization by-product (FGD) is a general term referring to a range of products formed when lime or limestone are used to remove $SO_2$ produced from the oxidation of pyrite in the coal. FGDs may be pure gypsum ($CaSO_4 \cdot 2H_2O$), anhydrite ($CaSO_4$), or $CaSO_3$. FGDs may also contain fly ash, unburnt carbon and unreacted lime.

Lime (CaO), calcium hydroxide ($Ca(OH)_2$), and limestone, as calcite ($CaCO_3$) or dolomite ($CaMg(CO_3)$) are commercial alkaline products familiar to those skilled in the art.

An example of the processes of the present invention is depicted in FIG. 1. As shown in FIG. 1, organic waste from source 1 and one or more coal combustion by-products from source 2 are added to a mixer 3 in which the organic waste and coal combustion by-products are mixed with one another to form an organic waste-coal combustion by-product mixture having a pH of at least about 9.5, preferably at least 10. According to one embodiment of the present invention, the mixing additionally includes mixing lime with the organic waste and coal combustion by-products. The organic waste-coal combustion by-product mixture is then transferred to a dryer 4. Alternatively, the organic waste and coal combustion by-products are mixed directly in the dryer 4 eliminating the need for a separate mixer 3.

Next, according to the embodiment depicted in FIG. 1, a dryer 4 dries the organic waste-coal combustion by-product mixture to at least 90% solids, preferably 95% solids, forming a dried organic waste-coal combustion by-product mixture. Commercial dryers, which may be used to accomplish such drying, are available in two forms, direct and indirect. A dryer according to the present invention may include at least one direct dryer or indirect dryer. Direct dryers use heated air in direct contact with the organic waste. According to one embodiment, exhaust stack gases from the power plant are used directly or waste steam or hot water from the power plant are used with a heat exchanger to heat air for drying. Alternatively, indirect dryers are used, which heat metal surfaces that come in contact with the organic waste. In one example of this embodiment, waste steam or hot water from the power plant is used to heat the drying surfaces via a heat exchanger in which the waste steam or water is used to heat oil, the fluid normally used in indirect dryers. Non-limiting examples of suitable dryers according to the present invention include direct concurrent flow dryers, horizontal single, double and triple pass indirect dryers, and vertical counter flow rotating disk indirect dryers.

The heat for the drying may include using waste heat 5 from the coal burning power plant in addition to or instead of heat from another source, such as a steam turbine 11 in the embodiment depicted in FIG. 1. As indicated above, the power plant waste heat 5 used in the drying may be in the form of hot exhaust gases, steam or hot water, for example, and may be used with direct or indirect dryers.

Drying the mixture of organic waste and coal combustion by-products at a pH above 9.5 or 10 causes ammonia to be liberated from the organic waste. The liberated ammonia is introduced as shown in stream 7, into a coal burner 6. The liberated ammonia that is introduced to the coal burner by the present processes and system, may supplement commercial anhydrous ammonia or urea added to the coal burner for $NO_x$ removal, depending on the amount of ammonia or urea needed in order to reduce the $NO_x$ emissions of a particular power plant to a desired (or required) level. The amount of ammonia or urea to be introduced to the coal burner for $NO_x$ removal may be determined by those skilled in the art.

Drying produces exhaust gasses, in addition to the ammonia and dried organic waste-coal combustion by-product mixture. According to one embodiment of the present invention, the process includes reacting scavenged exhaust gasses from the drying step with at least one reactive material to decrease the amount of carbon dioxide in the exhaust gasses and thereby decrease any carbon emissions from the drying step. Examples of suitable reactive materials would be apparent to those skilled in the art upon reading the present disclosure. Such reactive materials may include, for example, $Ca(OH)_2$.

One embodiment of the present invention includes a process where the coal combustion by-product is an alkaline mineral by-product and the drying step produces a by-product that may be useful, for example, as a soil additive to substitute for agricultural limestone to neutralize soil acidity. A further embodiment of the present invention is the by-product produced by this process.

Another embodiment of the present invention includes feeding the dried organic waste-coal combustion by-product mixture to a coal burner as supplemental fuel, along with coal. The dried organic waste-coal combustion by-product mixture may be suitable as a supplemental fuel because its caloric content is similar to that of coal. For example, undigested sewage sludge has a caloric content similar to that of coal, approximately 10,000 BTU per pound. The dried organic waste-coal combustion by-product mixture is preferably mixed with the coal prior to being fed to the coal burner. Preferably, the coal is pulverized coal.

An example of this embodiment is also depicted in FIG. 1. According to FIG. 1, the dried organic waste-coal combustion by-product mixture leaves the dryer 4 and is carried in stream 8 to the coal feed 9 where the coal feed is mixed with the dried organic waste-coal combustion by-product mixture prior to being introduced to the coal burner 6.

A further embodiment of the present invention includes the dried organic waste-coal combustion by-product mixture formed by the above-described processes. This mixture may be used for example, as a soil additive or may be added to a coal burner of a power plant as depicted for example as feed stream 8 in FIG. 1.

The present invention is further directed to systems including a coal burner, a coal feed to the coal burner, and an ammonia feed to the coal burner, where the ammonia feed includes ammonia liberated upon drying a mixture of organic waste and coal combustion by-products, where the mixture has a pH of at least 9.5, preferably at least 10. The steps involved in these systems, such as drying a mixture of organic waste and coal combustion by-products, and the ingredients of the system, such as the organic waste and coal combustion-by products, are as described above with regard to the processes of the present invention.

In one embodiment of the present system, the coal feed includes coal and the dried mixture of organic waste and coal combustion by-product as described above. Preferably, the coal is pulverized coal in this embodiment.

One preferred embodiment of the present invention includes a process in which organic waste is mixed with coal combustion by-products, with or without lime, to raise the pH of the mixture above 9.5. The mixture is then dried to at least 90% solids in a direct or indirect dryer using waste heat from the power plant. Liberated ammonia from the organic waste is introduced into the burner for $NO_x$ removal, and the dried organic waste-coal combustion by-product mixture is mixed with pulverized coal as supplemental fuel.

In a particularly preferred embodiment, fly ash with or without lime is added to organic waste to achieve a pH preferably greater than 10 and to aid in drying to high solids without the problem of fires or explosions. Hot exhaust gases, steam, hot water, or a combination of these heat sources scavenged from the power plant may be used to dry, in a direct or indirect dryer, the fly ash-organic waste mixture to a solids content of at least 95%, preferably near 100%. Exhaust gases from the dryer, containing free ammonia from the organic waste, are piped into the coal burner to supplement ammonia addition to the coal burner for $NO_x$ removal. Preferably, the dried fly ash-organic waste mixture is conveyed to the coal feed area of the power plant and mixed with coal prior to or after coal pulverization to serve as a supplemental fuel source. Alternatively, the dried fly ash-organic waste mixture can be used as a soil additive.

The present invention will now be described in detail with respect to showing how certain specific representative embodiments thereof can be made, the materials, apparatus and process steps being understood as examples that are intended to be illustrative only. In particular, the invention is not intended to be limited to the processes, materials, conditions, process parameters, apparatus and the like specifically recited herein.

EXAMPLE

An anaerobically digested sewage sludge is mixed with spent fluidized bed coal ash containing 10% by weight CaO at a coal-fired power plant burning high-S coal. Fly ash and sludge are mixed to form a mixture having a pH of 12 or above. The mixture is introduced into a vertical countercurrent indirect dryer with rotating plates in which the rotating plates are heated with excess steam from the power plant. The sludge contains 2% by dry weight of ammonia. Due to the high pH, ammonia is released from the sludge in the dryer and is exhausted and piped to the coal burner to supplement anhydrous ammonia or urea used for $NO_x$ control from the coal burner. The mixture is dried to >95% solids.

The dried mixture is conveyed by covered belt to the coal feed hopper where it is further mixed with coal. This mixture is fed into the coal pulverizer and thence into the burner. The mixing of high CaO fly ash with sludge results in the formation of $Ca(OH)_2$. The concurrent introduction of exhaust air from the plant results in carbonation of the $Ca(OH)_2$ to form $CaCO_3$. The presence of $CaCO_3$ in the dried mixture reduces the amount of commercial limestone required by the power plant for sulfur removal.

The processes and systems of the present invention are advantageous over previously known processes because combining organic waste drying with the addition of alkaline coal combustion by-products at a power plant allows the ammonia in the organic waste to be utilized for $NO_x$ removal, while taking advantage of the fuel value of the dried organic waste. The present processes and systems also provide flexibility in resource utilization in that the dried alkaline organic waste can be used either as fuel or as a separate product that can be applied to land as a soil additive.

While the present invention is described with respect to particular examples and preferred embodiments, it is understood that the present invention is not limited to these examples and embodiments. In particular, the present invention is not limited to the particular types of waste or by-products. Additionally, the components of the processes of the present invention are not limited to those described above or depicted in FIG. 1. For example, the processes of the present invention are not limited to a single dryer or a single coal burner and additional components may be added such as a sorbant 10 in FIG. 1, heat exchangers, belts, and the like.

The present invention as claimed therefore, includes variations from the particular examples and preferred embodiments described herein, as will be apparent to one of skill in the art.

We claim:

1. A process comprising
   mixing organic waste with coal combustion by-products to form an organic waste-coal combustion by-product mixture having a pH of at least 9.5;
   drying the organic waste-coal combustion by-product mixture to at least 90% solids forming a dried organic waste-coal combustion by-product mixture and causing ammonia to be liberated from said organic waste; and
   introducing said liberated ammonia into a coal burner of a coal burning power plant for $NO_x$ removal.

2. The process of claim 1, wherein said mixing further includes mixing lime with the organic waste and coal combustion by-products.

3. The process of claim 1, wherein said organic waste comprises waste selected from the group consisting of sewage sludges, animal manures, pulp and paper waste, fermentation waste, food processing waste, paper and cardboard, and other industrial organic waste.

4. The process of claim 1, wherein said coal combustion by-products comprise at least one by-product selected from the group consisting of fly ash, fluidized bed ash, flue gas desulfurization by-products, lime, calcium hydroxide, and calcium carbonate.

5. The process of claim 1, wherein drying takes place in at least one dryer.

6. The process of claim 1, wherein said drying is conducted using a direct dryer.

7. The process of claim 1, wherein said drying is conducted using an indirect dryer.

8. The process of claim 5, wherein said dryer is selected from the group consisting of direct concurrent flow dryers, horizontal single, double and triple pass indirect dryers, and vertical counter flow rotating disk indirect dryers.

9. The process of claim 1, wherein the heat for said drying includes waste heat from said coal burning power plant.

10. The process of claim 1, wherein said drying comprises drying the organic waste-coal combustion by-product mixture to at least 95% solids.

11. The process of claim 1, wherein when said coal combustion by-product comprises an alkaline mineral by-product, the drying step produces a further by-product.

12. A further by-product produced by a process comprising
   mixing organic waste with coal combustion by-products to form an organic waste-coal combustion by-product mixture having a pH of at least 9.5;
   drying the organic waste-coal combustion by-product mixture to at least 90% solids forming a dried organic waste-coal combustion by-product mixture and causing ammonia to be liberated from said organic waste; and
   introducing said liberated ammonia into a coal burner of a coal burning power plant for $NO_x$ removal;
   wherein when said coal combustion by-product comprises an alkaline mineral by-product, the drying produces a further by-product.

13. The process of claim 1, further comprising reacting scavenged exhaust gasses from said drying with at least one reactive material to decrease the amount of carbon dioxide in said exhaust gasses and thereby decrease any carbon emissions from the drying.

14. The process of claim 13, wherein said reactive material comprises $Ca(OH)_2$.

15. The process of claim 1, further comprising mixing the dried organic waste-coal combustion by-product mixture with coal.

16. The process of claim 15, wherein the coal is pulverized coal.

17. The process of claim 15, further comprising feeding the mixture formed by mixing the by-product with coal into said coal burner.

18. A dried organic waste-coal combustion by-product mixture formed by a process comprising
   mixing organic waste with coal combustion by-products to form an organic waste-coal combustion by-product mixture having a pH of at least 9.5;
   drying the organic waste-coal combustion by-product mixture to at least 90% solids forming a dried organic waste-coal combustion by-product mixture and causing ammonia to be liberated from said organic waste; and
   introducing said liberated ammonia into a coal burner of a coal burning power plant for $NO_x$ removal.

19. A soil additive comprising a dried organic waste-coal combustion by-product mixture formed by a process comprising
   mixing organic waste with coal combustion by-products to form an organic waste-coal combustion by-product mixture having a pH of at least 9.5;
   drying the organic waste-coal combustion by-product mixture to at least 90% solids forming a dried organic waste-coal combustion by-product mixture and causing ammonia to be liberated from said organic waste; and
   introducing said liberated ammonia into a coal burner of a coal burning power plant for $NO_x$ removal.

20. A feed-stock comprising dried organic waste-coal combustion by-product mixture formed by the process of claim 1.

21. A process for supplying ammonia to a coal burning power plant, comprising
   mixing organic waste with coal combustion by-products to form an organic waste-coal combustion by-product mixture having a pH of at least 9.5;
   drying the organic waste-coal combustion by-product mixture to at least 90% solids forming a dried organic waste-coal combustion by-product mixture and causing ammonia to be liberated from said organic waste; and
   introducing said liberated ammonia into a coal burner of a coal burning plant for $NO_x$ removal.

22. A system comprising
   a coal burner of a coal burning power plant;
   a coal feed supplying coal to said coal burner; and
   an ammonia feed to said coal burner comprising ammonia liberated upon drying a mixture of organic waste and coal combustion by-products, said mixture having a pH of at least 9.5.

23. The system of claim 22, wherein said coal feed comprises coal and a dried mixture of organic waste and coal combustion by-product.

24. The system of claim 23, wherein said coal is pulverized coal.

25. The system of claim 23, wherein said coal and said dried mixture of organic waste and coal combustion by-product are mixed and then pulverized.

* * * * *